(No Model.)
W. B. WHERRY.
PLOW.
No. 498,095.  Patented May 23, 1893.
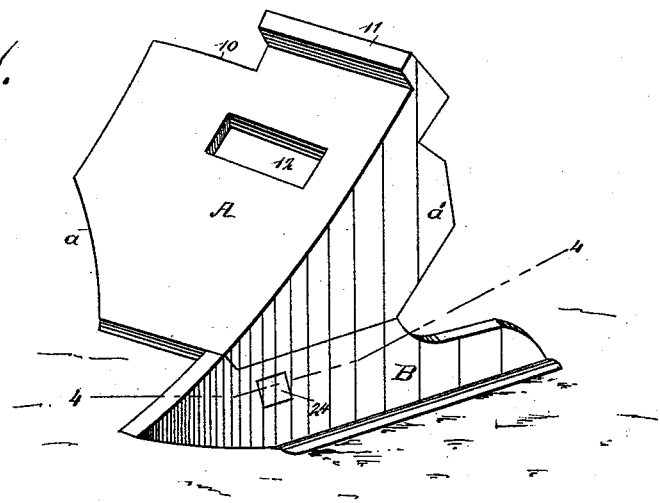
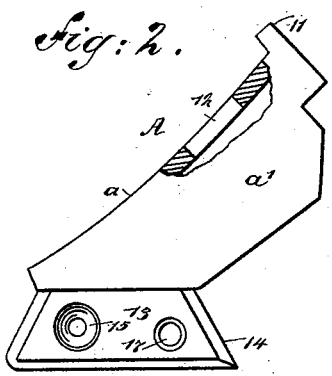
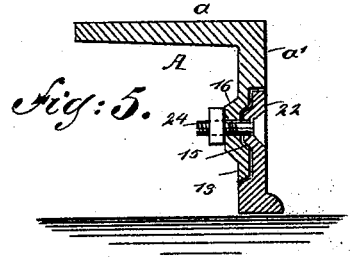
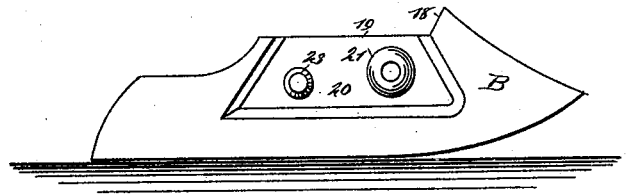
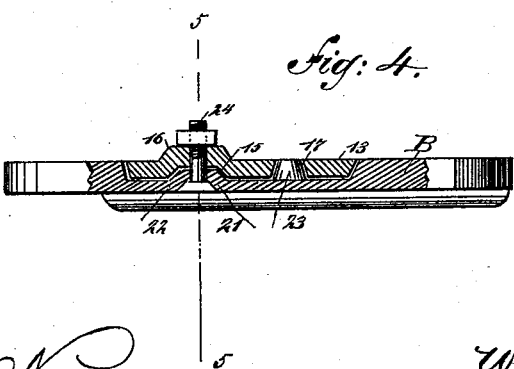
WITNESSES:
Chas. Nidu.
C. Sedgwick
INVENTOR
W. B. Wherry
BY Munn & Co
ATTORNEYS.
THE NORRIS PETERS CO., PHOTO-LITHO., WASHINGTON, D. C.

UNITED STATES PATENT OFFICE.

WILLIAM B. WHERRY, OF OVERTON, TEXAS.

PLOW.

SPECIFICATION forming part of Letters Patent No. 498,095, dated May 23, 1893.

Application filed January 28, 1893. Serial No. 460,094. (No model.)

*To all whom it may concern:*

Be it known that I, WILLIAM B. WHERRY, of Overton, in the county of Rusk and State of Texas, have invented a new and Improved Plow, of which the following is a full, clear, and exact description.

My invention relates to an improvement in plows, and especially to an improvement in land-sides for plows, and it has for its object to provide a land-side capable of being expeditiously and conveniently removed from the shank plate of the plow, and to so construct the shank plate that the share when placed thereon will be firmly held in position and be prevented from slipping vertically.

It is a further object of the invention to provide an interlocking connection between the land-side of the shank plate and the land-side proper, which connection, with the additional employment of bolts, will firmly unite one part to the other, and yet, as heretofore stated, admit of the land-side being conveniently and expeditiously removed, if in practice such action may be found desirable.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a perspective view of the shank plate and land side connected therewith. Fig. 2 is a detail side elevation and partial sectional view of the shank plate viewed from the outer side thereof. Fig. 3 is an inner side elevation of the land side. Fig. 4 is horizontal section taken essentially on the line 4—4 of Fig. 1, illustrating the manner in which the shank plate and the land side of the plow are connected; and Fig. 5 is a vertical section through the said connection, the section being taken on the line 5—5 of Fig. 4.

In carrying out the invention, the shank plate A, adapted to hold the plow share, is provided at its upper end with a recess 10, the said recess being located at one edge of the plate, while the remaining portion of the edge is provided with a forwardly-extending flange 11, the said flange being adapted to engage with the upper portion of the plow share and prevent it from moving upward, while the recess 10, will admit of the mold board extending beyond the shank plate. The shank plate is further provided with an elongated slot 12, ordinarily produced transversely therein, through which the fastening bolt of the plow share is to pass. The shank plate is angular in cross section, comprising the front member *a*, the peculiarities of which have been above described, and a side member *a'*, the latter being located at the land-side face of the plate. At the lower forward end of the side member *a'* of the shank plate a downwardly extending tongue 13, is formed preferably integral with the side member *a'*, the inner face of the tongue being usually substantially flush with the inner surface of the said member, but the outer surface of the tongue is considerably back of the outer face of the side member of the plate, as shown in Fig. 2. The tongue is preferably made practically dove-tailed shape in general contour, and its edges are beveled, as shown at 14 in Fig. 2.

The tongue 13, is provided with a circular depression 15 in its outer face near its forward edge, and a corresponding embossed surface 16 upon its inner face, an aperture extending through the center of the embossed and depressed surfaces, as shown in Figs. 2 and 4; and adjacent to the depression 15, near the opposite side edge of the tongue, a conical opening 17, is produced.

The land-side B, is shown in detail in Fig. 3, the view being an inner face view; and the land-side is provided with an upper shoulder 18 and a recess 19 adjacent to the shoulder; and the lower edge of the side member of the shank plate is shaped to fit against the shoulder 18 and upon the base wall of the recess 19 when the forward edge of the land-side is flush or practically so, with the upper face of the main member *a* of the shank plate, as shown in Fig. 1. In the inner face of the land-side a recess 20, is produced, corresponding in shape to the shape of the tongue 13, which tongue it is adapted to receive; and the vertical side wall of the recess 20, is provided with a circular projection 21, the opposite face of the land-side being correspondingly tapered, forming a countersink 22, as shown in Figs. 4 and 5, and upon the said side wall of the recess 20, a post 23, is formed, conically shaped and of proper diameter to enter the conical opening or aperture 17 in the shank plate. The land-side is removably secured to the shank plate by introducing the tongue 13 into the recess 20 of the land-side, whereupon the embossed surface or circular projection 21 of the land-side will enter the depression 15 in the tongue, and the post 23 of the land-side will enter the aperture 17 of the tongue, as shown in Fig. 4. By this means an interlocking connection is effected between the two parts, and a bolt 24 is then passed through the embossed surfaces 16 of the tongue and 21 of the land-side, the head of the bolt being located in the countersink 22, the said countersink being preferably made square, as is likewise the head of the bolt, the opposite end of the bolt which passes through the land-side and the tongue of the shank plate being provided with a suitable lock nut.

From the foregoing description and the drawings, it will be understood that the land-side is brought in firm yet proper locking engagement with the shank plate; and that the land-side serves likewise as a support for the share. It is furthermore obvious that the land-side can be removed from the shank plate whenever desired, and another substituted therefor.

Having thus described my invention, I claim as new and desire to secure by Letters Patent—

1. In a plow, a shank plate having a front and side member, the front member being apertured and provided with a rib or flange at its upper end and with a recess adjacent to said rib or flange, substantially as described.

2. In a plow, a shank plate having a front and side member, the front member being apertured and provided in its upper end with a recess and flange, and the side member having a tongue on its lower edge, substantially as described.

3. In a plow, a shank plate having a front and side member, the front member being apertured and provided at its upper end with a recess and flange, and the side member having a dovetail tongue, the said tongue being back of the outer face of the member and provided with a depression and apertures, substantially as herein shown and described.

4. In the construction of a plow, the combination with a land-side having a recess formed therein, and a stud located within the recess, and likewise an embossed surface, of a shank plate provided with a tongue shaped to enter the recess of the land-side, said tongue being provided with a cavity to receive the embossed surface of the land-side and an aperture to receive the post thereof, and a locking bolt connecting the land-side with the tongue of the shank, the said bolt passing through the embossed surface of the land-side, and the surface of the tongue receiving the embossed portion of the land-side, as and for the purpose set forth.

WILLIAM B. WHERRY.

Witnesses:
J. W. OVERTON,
R. W. HALL.